United States Patent
Kasilya Sudarsan et al.

(10) Patent No.: US 12,001,261 B2
(45) Date of Patent: Jun. 4, 2024

(54) POWER OPTIMIZATION FOR SMARTWATCH

(71) Applicant: QUALCOMM Incorporated, San Diego, CA (US)

(72) Inventors: Vishnu Vardhan Kasilya Sudarsan, Bangalore (IN); Jaipal Reddy, Bidar (IN); Pruthvi Raj Singh, Hyderabad (IN); Shilpa Melinamutt, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/809,169

(22) Filed: Jun. 27, 2022

(65) Prior Publication Data

US 2023/0418356 A1  Dec. 28, 2023

(51) Int. Cl.
| | | |
|---|---|---|
| *G06F 1/00* | (2006.01) | |
| *G04G 21/02* | (2010.01) | |
| *G06F 1/3231* | (2019.01) | |
| *G06F 21/32* | (2013.01) | |
| *G06V 40/16* | (2022.01) | |
| *G06F 1/3203* | (2019.01) | |

(52) U.S. Cl.
CPC ........... *G06F 1/3231* (2013.01); *G04G 21/02* (2013.01); *G06F 21/32* (2013.01); *G06V 40/166* (2022.01); *G06V 40/172* (2022.01); *G06F 1/3203* (2013.01)

(58) Field of Classification Search
CPC ....... G06F 1/3231; G06F 21/32; G04G 21/02; G06V 40/166; G06V 40/172

USPC .......................................................... 713/323
See application file for complete search history.

(56) References Cited

U.S. PATENT DOCUMENTS

| | | | |
|---|---|---|---|
| 6,111,580 A | 8/2000 | Kazama et al. | |
| 9,195,219 B2 | 11/2015 | Hong et al. | |
| 9,367,086 B2 | 6/2016 | Yilmaz | |
| 10,175,656 B2 | 1/2019 | Park | |
| 10,386,888 B2 | 8/2019 | Berardinelli | |
| 11,537,696 B2 * | 12/2022 | Zhou | G06F 3/013 |
| 2016/0061600 A1 * | 3/2016 | Dharawat | G06F 1/3231 |
| | | | 702/150 |

(Continued)

FOREIGN PATENT DOCUMENTS

WO   2021021224 A1   2/2021

OTHER PUBLICATIONS

Pixart Imaging Inc: "PAJ6100U6: Global Shutter Image Module", Version 0.4, May 17, 2018, pp. 1-39.

(Continued)

*Primary Examiner* — Volvick Derose
(74) *Attorney, Agent, or Firm* — QUALCOMM Incorporated

(57) ABSTRACT

Systems and methods for improving power usage of a wireless device are disclosed. The wireless device includes a memory; and at least one processor communicatively coupled to the memory, the at least one processor configured to: determine a change in ambient light received by the wireless device; determine a position of the wireless device; activate a low power image sensor based on at least one of the change in the ambient light or the position of the wireless device; detect a face using the low power image sensor; and turn on a display of the wireless device based on a user face being the face detected.

40 Claims, 5 Drawing Sheets

(56) References Cited

U.S. PATENT DOCUMENTS

| | | | |
|---|---|---|---|
| 2016/0202665 A1* | 7/2016 | Park | G06F 3/165 |
| | | | 368/225 |
| 2016/0239190 A1* | 8/2016 | Forutanpour | G06F 1/1652 |
| 2018/0137862 A1* | 5/2018 | Park | G06V 40/171 |
| 2018/0165437 A1* | 6/2018 | Shim | G06V 10/17 |
| 2019/0213309 A1* | 7/2019 | Morestin | G01S 17/04 |
| 2019/0339784 A1 | 11/2019 | Lemay et al. | |
| 2021/0112188 A1* | 4/2021 | Gao | H04N 23/71 |
| 2021/0294104 A1* | 9/2021 | Hossain | G06F 3/011 |
| 2022/0007185 A1 | 1/2022 | Seo et al. | |
| 2022/0147142 A1* | 5/2022 | Bui | G09G 3/3406 |
| 2022/0163650 A1* | 5/2022 | Min | G06V 40/172 |
| 2022/0269800 A1* | 8/2022 | Cui | H04M 1/72463 |
| 2023/0273687 A1* | 8/2023 | Bechstein | G06F 3/0383 |
| | | | 345/179 |

OTHER PUBLICATIONS

International Search Report and Written Opinion—PCT/US2023/020186—ISA/EPO—dated Aug. 22, 2023.

\* cited by examiner

POWER OPTIMIZATION FOR SMARTWATCH

BACKGROUND OF THE DISCLOSURE

1. Field of the Disclosure

Aspects of the disclosure relate generally to power usage improvements in wireless devices, such as smart watches and smart bands.

2. Description of the Related Art

Smart watches and bands have become very popular among various users for various applications. Smart watches and bands may be used to track the amount of various exercises performed by the users, listen to music, detect heart rate, receive phone calls, etc. However, smart watches and bands must use power efficiently to increase the battery life between charges. One feature to increase power efficiency or improve power usage is the "tilt to wake up" (TTW) method that turns on the display and features of a smart watch when the user tilts the smart watch. However, the TTW method may waste battery power due to false alarms when the smart watch turns on the display and features unnecessarily. For example, the TTW method may reduce the battery life by 20-30% in one battery charge cycle.

Thus, there is a need for more efficient power usage methods for smart watches, smart bands and other wireless devices that are battery powered.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of improving power usage of a wireless device includes determining a change in ambient light received by a light sensor of the wireless device; determining a position of the wireless device using a motion sensor; activating a low power image sensor based on at least one of the change in the ambient light or the position of the wireless device; detecting a face using the low power image sensor; and turning on a display of the wireless device based on an authorized user face being the face detected.

In an aspect, a wireless device includes a light sensor; a low power image sensor; a motion sensor; and at least one processor communicatively coupled to the memory, the light sensor, the motion sensor and the low power image sensor, the at least one processor configured to: determine a change in ambient light received by the light sensor of the wireless device; determine a position of the wireless device using the motion sensor; activate the low power image sensor based on at least one of the change in the ambient light or the position of the wireless device; detect a face using the low power image sensor; and turn on a display of the wireless device based on an authorized user face being the face detected.

In an aspect, a wireless device includes means for determining a change in ambient light received by the wireless device; means for determining a position of the wireless device; means for activating a low power image sensor based on at least one of the change in the ambient light or the position of the wireless device; means for detecting a face using the low power image sensor; and means for turning on a display of the wireless device based on an authorized user face being the face detected.

In an aspect, a non-transitory computer-readable medium configured to store computer-executable instructions that, when executed by a processor, cause the processor to: determine a change in ambient light received by a light sensor of a wireless device; determine a position of the wireless device using a motion sensor; activate a low power image sensor based on at least one of the change in the ambient light or the position of the wireless device; detect a face using the low power image sensor; and turn on a display of the wireless device based on an authorized user face being the face detected.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of thereof.

DETAILED DESCRIPTION

Figure 1:
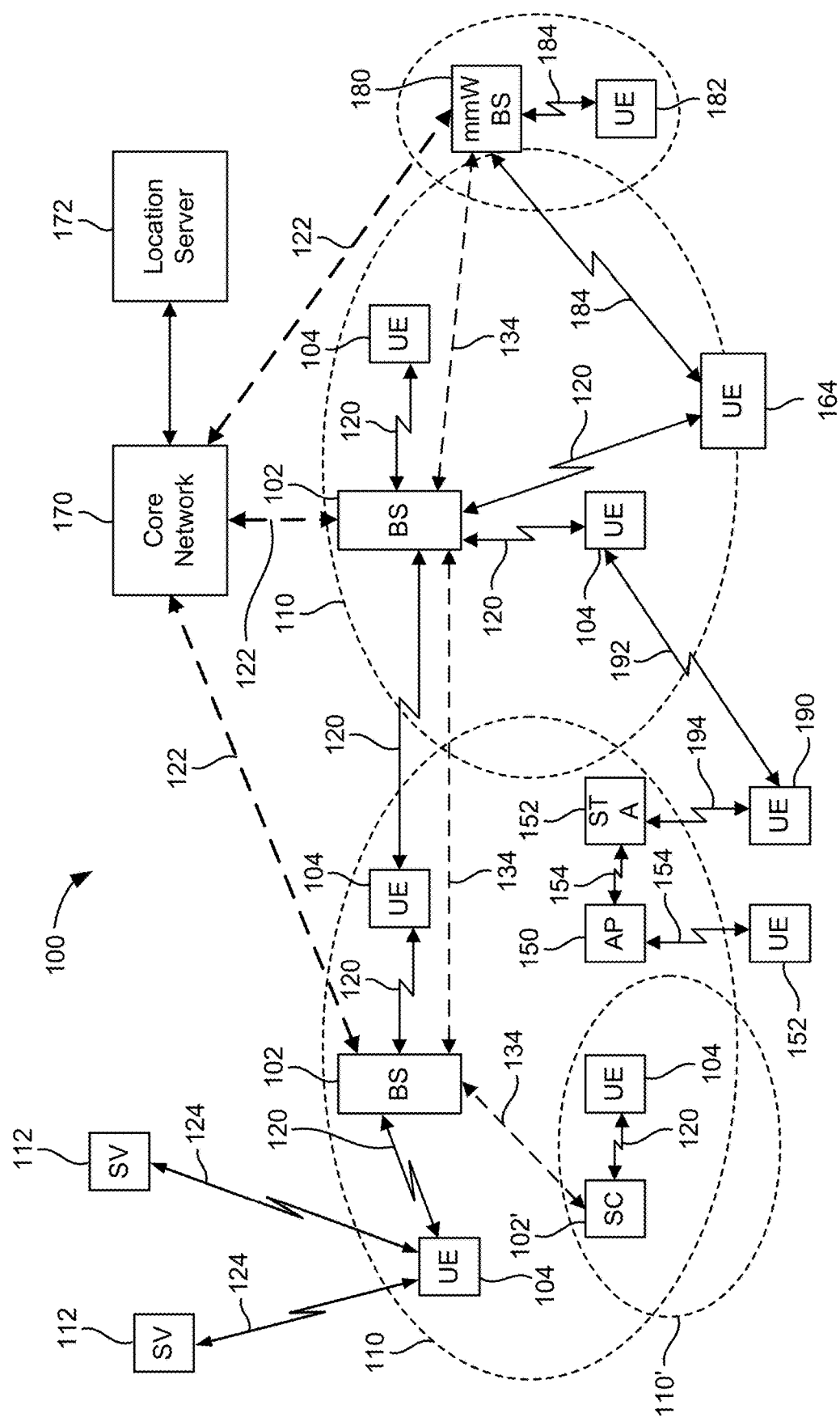
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. As used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

As used herein the terms smart watch and smart band may be used interchangeably and the use of one term does not exclude the other. In some aspects a smart watch or smart band may include one or more aspects of the various UE's discussed above, such as the ability to directly communicate over the cellular network with the various base stations using various technologies (e.g., LTE, 5G, etc.), communicate over a WLAN network, communicate directly with another UE, etc. Therefore, in accordance with the various aspects disclosed herein the UEs described in the foregoing, may be implemented in various forms, including but not limited to smart watches, smart bands, smart phones, tablets, and other devices which can perform the aforementioned functionalities. Accordingly, it will be appreciated that the foregoing illustrations are merely examples and should not be construed to limit the various aspects disclosed herein.

Figure 2:
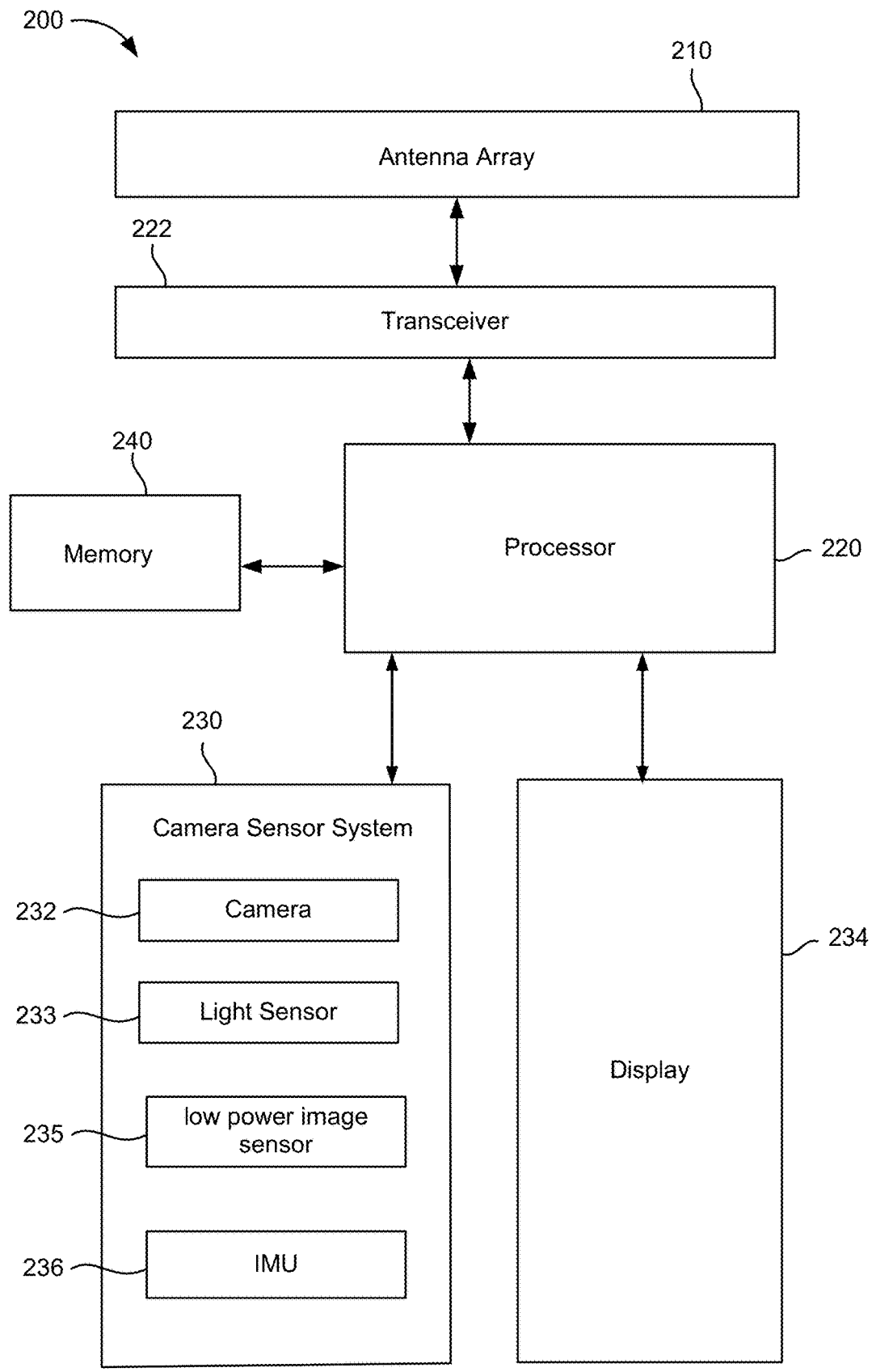
FIG. 2 illustrates an exemplary wireless device, according to aspects of the disclosure.

FIG. 2 illustrates a simplified schematic of an exemplary wireless device 200 with processor 220, antenna array 210, transceiver 222, camera sensor system 230 and display 234 is illustrated. Wireless device 200 further comprises memory 240. Camera sensor system 230 includes camera 232, light sensor 233, low power image sensor 235 and a motion sensor, such as, inertial measurement unit (IMU) 236. In some aspects, the low power image sensor 235 may consume less than 10 milliwatts (mw) of power, as opposed to hundreds of milliwatts consumed by conventional cameras in wireless devices, such as camera 232. In some aspects, the low power image sensor 235 may be a Glance sensor. In an aspect, the motion sensor, e.g., IMU 236, may include an accelerometer, a gyroscope, a magnetometer and/or other sensors that are can be used to measure and detect the movement of wireless device 200. In the following description, IMU may be used to describe various aspects and functionalities of motion detection, but it will be appreciated that the various aspects are not limited to an IMU, but instead may include any device that can perform the functionalities disclosed and claimed herein. It will be appreciated that wireless device 200 may be similar to UE 104, 190 or any other UEs shown in FIG. 1 and may further comprise one or more additional components to provide the various functionalities of the UEs described herein (e.g., separate SPS receivers, additional processors, additional wireless transceivers, etc.) and which are not expressly illustrated in FIG. 2 to avoid unnecessary complexity.

Figure 4A:
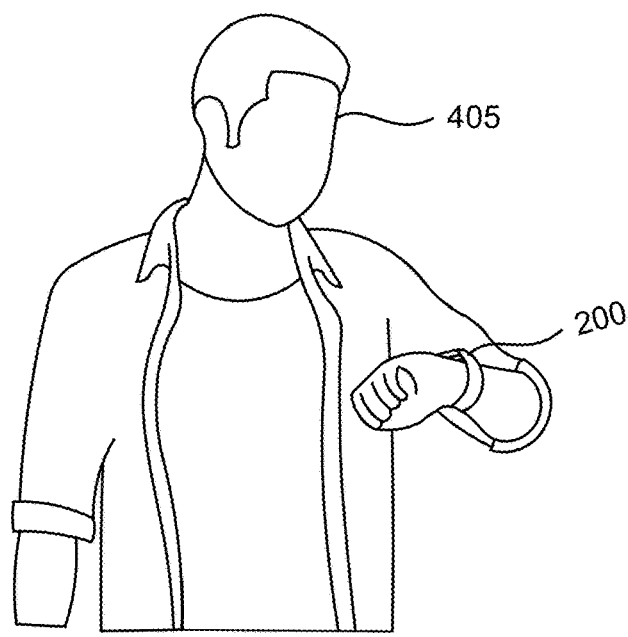
FIG. 4A illustrates an exemplary implementation of a wireless device according to various aspects of the disclosure.

Wireless device 200 may be any suitable electronic device that can communicate wirelessly and may in some aspects be a mobile device. For example, in some aspects, the wireless device 200 may be a smart watch, a smart band, a smartphone, a tablet, a laptop, a shipment tracking device, a wearable, smart glasses, an onboard computer installed on a vehicle or the like. In various aspects, wireless device 200 may be a smart watch or smart band that can be worn around a wrist of a user of wireless device 200, such as shown in FIG. 4A.

In some aspects, antenna array 210 includes multiple antennas for transmit and receive beamforming. Antenna array 210 is coupled to transceiver 222. Processor 220 may control antenna array 210 and transceiver 222. Transceiver 222 may include a wireless wide area network (WWAN) transceiver providing means for communicating (e.g., means for transmitting, means for receiving, means for measuring, means for tuning, means for refraining from transmitting, etc.) via one or more wireless communication networks (see, e.g., FIG. 1), such as an NR network, an LTE network, a GSM network, and/or the like. The WWAN transceiver may be connected to one or more antennas in the antenna array 210 for communicating with other network nodes, such as other UEs, access points, base stations (e.g., eNBs, gNBs), etc., via at least one designated radio access technology (RAT), such as, NR, LTE, GSM, etc., over a wireless communication medium of interest (e.g., some set of time/frequency resources in a particular frequency spectrum). In some aspects, the transceiver 222 may further include a wireless local area network (WLAN) transceiver. The WLAN transceiver may be connected to one or more antennas in antenna array 210 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest.

In addition, in some aspects the transceiver 222 may include satellite positioning systems (SPS) receivers. The SPS receivers may be connected to one or more antennas in antenna array 210, respectively, and may provide means for receiving and/or measuring SPS signals, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers may comprise any suitable hardware and/or software for receiving and processing SPS signals. While the foregoing discussed various aspects where the transceiver included multiple wireless communication technologies, it will be appreciated that in some aspects, one or more wireless communication technologies may be used and the various aspects are not limited to any specific combinations of wireless communication technologies.

Transceiver circuitry in transceiver 222 including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas such as antenna array 210, that permits the respective apparatus to perform transmit "beamforming," as described herein. Similarly, a receiver may include or be coupled to a plurality of antennas such as antenna array 210, that permits the respective apparatus to perform receive beamforming, as described herein. In an aspect, the transmitter and receiver may share the same plurality of antennas (e.g., antenna array 210), such that the respective apparatus can only receive or transmit at a given time, not both at the same time.

As shown in FIG. 2, processor 220 is coupled to transceiver 222. Processor 220 is also coupled to memory 240 and camera sensor system 230 as shown in FIG. 2. Camera sensor system 230 includes camera 232, light sensor 233, low power image sensor 235 and inertial measurement unit (IMU) 236, as discussed above. Camera sensor system 230 detects and measures its respective environment and transmits the measurement data to processor 220. IMU 236 may measure the movement of wireless device 200 including the movement in the three-dimensional coordinate system and the rotational movement. In an aspect, processor 220 may control the operation of camera sensor system 230. In addition, processor 220 is coupled to display 234 and may control the operation of display 234, including when to turn on display 234 and when to turn off display 234.

In an aspect, processor 220 may control camera 232, light sensor 233, low power image sensor 235 and IMU 236 in camera sensor system 230 and receive data from camera 232, light sensor 233, low power image sensor 235 and IMU 236. IMU 236 may measure the movement and the orientation of wireless device 200 including the rotational movement and the movement in the three-dimensional coordinate system (e.g., Cartesian coordinate system (x, y, z), spherical coordinate system, etc.). IMU 236 may also measure the velocity of the movement of wireless device 200. IMU 236 may transmit the measured movement and orientation data to processor 220. Light sensor 233 may measure the ambient light surrounding wireless device 200 and transmit the measured ambient light data to processor 220 as directed by processor 220.

In an aspect, the low power image sensor 235 may include an image sensor and a low power processor that runs computer vision algorithm. In some aspects, the low power image sensor 235 may recognize when a person is facing display 234 and may recognize the angle and the orientation of the person's face when facing display 234. Low power image sensor 235 may transmit the data regarding whether a person is facing display 234 and the angle and the orientation of the person's face (such as upside down or right side up or other orientation data) while facing display 234.

In various aspect, wireless device 200 may be a smart watch or smart band that can be worn around a wrist of a user of wireless device 200 as illustrated in FIG. 4A. The exemplary illustration in FIG. 4A shows user 405 wearing wireless device 200 around the user's wrist. As used herein, the term "user" will generally refer to the wearer (e.g., smart watch, smart band) or holder of the wireless device and does not necessarily infer that the user has authorization to use the wireless device. The low power image sensor 235 generally will not perform specific facial recognition of a given person, but is generally capable of detecting facial features and orientation to allow for recognition of a face facing the wireless device, which can be inferred as a person wearing or holding the wireless device based on the particular orientation. As discussed above, processor 220 directs light sensor 233 to detect the ambient light surrounding wireless device 200. For example, in some aspects, when user 405 moves wireless device 200 by moving the user's arm, the amount of light received by light sensor 233 may change and fluctuate. In some aspects, the amount of light received by light sensor 233 when wireless device 200 is near the waist of user 405 may be different than the amount of light received when user 405 moves wireless device 200 to the chest to look at the display 234 as shown in FIG. 4A. In some aspects, processor 220 may receive the ambient light data from light sensor 233 at certain time intervals. In some aspects, the time intervals may be predetermined, and in other aspects, processor 220 may vary the time intervals. As discussed below, processor 220 may calculate the differences or changes in the received ambient light at different time intervals. If the difference or change in the received ambient light exceeds a certain threshold, wireless device 200 may take one or more actions, as discussed below. For example, general ambient light conditions can be considered as low light, indoor and outdoor depending on the ranges (see Table 1 below). In each of these ranges it is presumed that there will be a change in the ambient light conditions that will exceed a change threshold. For example, the change in the ambient light conditions may occur when a user moves the users arm from a non-viewable position of the wireless device to a viewable position (e.g., from the users arm and smart watch being at the user's side and facing sideways to the smart watch moved to chest level and generally being orientated facing up and toward the user's face). The change threshold for each of the various ambient conditions may be set as a constant, e.g., greater than 15% over the prior average lux values, as specific lux values for each range, or may vary depending on the ambient conditions. In some aspects, the change threshold can be based on the ambient light being classified as one of low light, indoor or outdoor. For example, the change threshold may be greater for outdoor conditions than indoor, as the ambient light values may vary more in an outdoor setting (e.g., see Table 1 values). However, it will be appreciated that the values are merely representative and the various aspects disclosed are not limited to these specific values or ranges. Further, additional criteria, such as time of day, weather conditions, user posture, etc. may be used to adjust the thresholds.

TABLE 1

| Condition | Mean lux values | Change Threshold |
|---|---|---|
| Low light | >= 5 to <= 300 | >15% |
| Indoor | >= 700 to <= 3000 | >30% |
| Outdoor | >= 7500 to <= 65000 | >50% |

In addition, processor 220 may use the data received from IMU 236 to determine the positional information of wireless device 200 including at least one of the orientation, translation and/or motion of wireless device 200. The positional information may include the angles, rotations and movements of wireless device 200 in multiple axes as processed by processor 220 based on the data detected by IMU 236. Processor 220 may use algorithms, such as rotation vector algorithms, to determine the positional information of wireless device 200. Such algorithms may be stored in memory 240 and processed by processor 220. For example, the processor 220 may use a combination of data from IMU 236 to compute the positions of wireless device 200 in two-dimensional (2D) and/or three-dimensional (3D) coordinate systems.

Based on the data received from IMU 236, processor 220 may determine whether wireless device 200 has moved, and if so, determine the position of wireless device 200. Processor 220 may determine the movement and position of wireless device 200 at certain time intervals. In an aspect, the time intervals may be predetermined, and in other aspects, processor 220 may vary the time intervals. For example, user 405 may initially have wireless device 200 at the user's side, but later, user 405 may move wireless device 200 to the user's chest area or region to look at display 234, as shown in FIG. 4A. In an aspect, processor 220 may determine whether wireless device 200 has moved into a position that allows for user 405 to see display 234. It will be appreciated that multiple positions may satisfy the aspect of a position that allows for user 405 to see display 234, such as any time the wireless device 200 is within a given region and/or orientation relative to the user 405. When wireless device 200 has moved into such position, processor 220 may take further actions as discussed below.

In an aspect, when processor 220 determines that the change in the ambient light received by wireless device 200 has exceeded a certain threshold, processor 220 may activate and direct low power image sensor 235 to detect that a face is facing display 234. In another aspect, when processor 220 determines that the movement and position of wireless device 200 allows for user 405 to see display 234 (such as moving wireless device 200 to the chest level or turning the wrist such that display 234 can be seen by the user), processor 220 may direct low power image sensor 235 to detect the face that is facing display 234. In an aspect, low power image sensor 235 may be placed behind or adjacent to display 234 such that orientation of low power image sensor 235 is in line with the display 234 to facilitate detecting a face that is facing display 234. Low power image sensor 235 may detect a face by parsing one or more images produced by the image sensor in low power image sensor 235. For example, a face may be detected by determining a general shape and one or more features, such as eyes, nose, etc. The orientation of the face may be detected by the relative position of the feature(s) and whether they are visible. For example, if only one eye is visible, it would indicate the user's head is turned away. The angle of the user's head may be determined based on the relative position of the feature(s). Once again, it will be appreciated that low power image sensor 235 determines features that are not used for user facial recognition, but can be used to recognize features to detect a face and an orientation of the face. In yet another aspect, processor may direct low power image sensor 235 to detect the face that is facing display 234 when two or more conditions are met. For example, the two or more conditions may include a change in the received ambient light detected by the wireless device 200 has exceeded a change threshold and the movement and position of wireless device 200 indicates that the position of the wireless device 200 allows for user 405 to see display 234. In some aspects, the positions or regions for which the processor may direct low power image sensor 235 to detect the face that is facing display 234 may vary based on a position or orientation of a user. For example, if a user is detected as being bent over, the processor may direct low power image sensor 235 to detect the face that is facing display 234, when the wireless device 200 is below the chest level. It will be appreciated that many other orientations of the user and the wireless device may allow for the user to be able to view the display 234 and the various aspects disclosed herein are not limited to any specific orientation, in which low power image sensor 235 may detect a face that is facing display 234 as directed by processor 220.

Figure 4B:
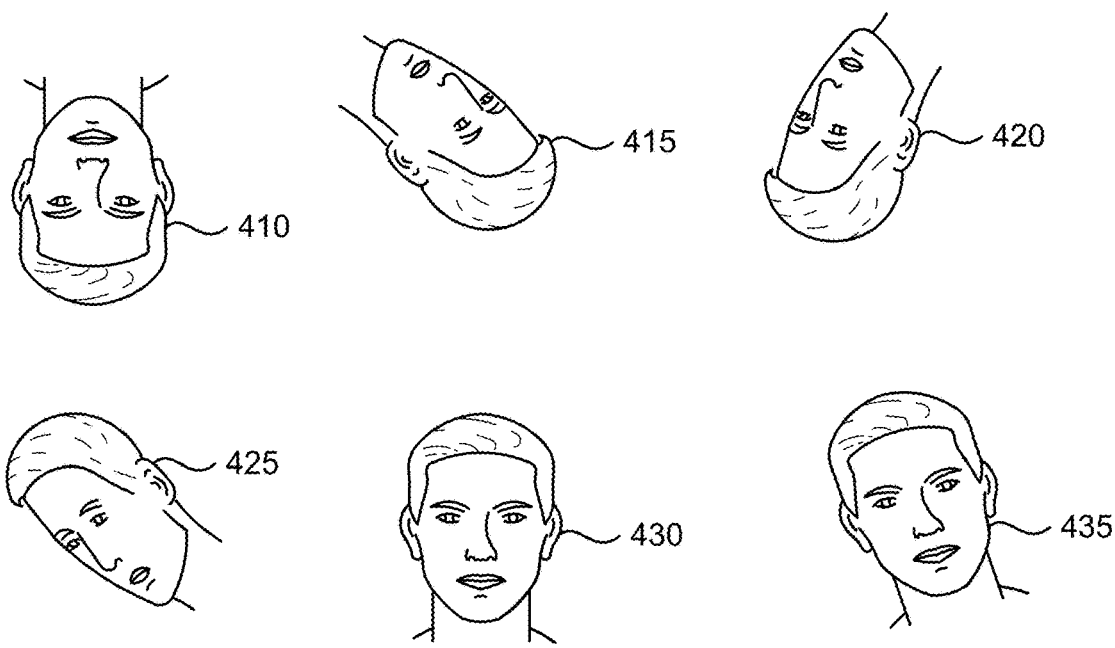
FIG. 4B illustrates various exemplary face detections.

FIG. 4B shows different types of exemplary facial orientations that may be detected by low power image sensor 235. Examples 410, 415 and 420 show faces that are detected upside down by low power image sensor 235. Such cases may occur when low power image sensor 235 detect faces from people surrounding user 405 instead of user 405. For example, when wireless device 200 is down at the side of user 405, low power image sensor 235 may detect a face of a person adjacent to user 405 or across from user 405. In these cases, the face detected by low power image sensor 235 may be upside down as shown by example faces 410, 415 and 420. However, if user 405 is facing low power image sensor 235, it is likely that the face detected by low power image sensor 235 is upright as shown by example faces 430 and 435. Example face 425 shows an upright face, but the tilt or angle of the face may exceed a face tilt threshold. If the tilt or angle of an upright face detected by low power image sensor 235 exceeds a certain threshold (i.e., face tilt threshold of minus fifty degrees to plus fifty degrees, where zero degrees is the orientation of upright face 430), it is likely that low power image sensor 235 has detected a face of a person adjacent to user 405 instead of user 405.

In an aspect, if processor 220 determines that the face detected by low power image sensor 235 is not the face of user 405 such as example faces 410, 415, 420 and 425, processor 220 may not turn on display 234 to reduce the power usage of wireless device 200. However, if processor 220 determines that the face detected by low power image sensor 235 is the face of user 405 such as example faces 430 and 435, processor 220 may turn on display 234 so that user 405 can see the content on display 234. In some aspects, when the user's face is detected, the camera 232 may be activated to perform authentication of a specific user (i.e., authorized user) that is authorized to use the wireless device and/or other authentication methods (e.g., biometric user identification, etc.) may be performed before turning on the display 234.

In summary, processor 220 may not activate low power image sensor 235 to detect a face unless the change in the ambient light exceeds a certain threshold and/or the movement and position of wireless device 200 allow for user 405 to see display 234. In addition, if low power image sensor 235 is activated to detect a face and detects a face that is unlikely to be the face of user 405 (such as examples 410, 415, 420 and 425), processor 220 may not turn on display 234. However, if low power image sensor 235 is activated and detects a face that is likely to be user 405's face, processor 220 may turn on display 234 so that user 405 can see the content on display 234.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 240 may be implemented by processor and memory component(s) of the wireless device 200 (e.g., by execution of appropriate code and/or by appropriate configuration of processor components). However, as will be appreciated, such operations, acts, and/or functions may actually be performed by specific components or combinations of components of wireless device 200, such as antenna array 210, transceiver 222, processor 220, camera sensor system 230, display 234 and memory 240. Accordingly, it will be appreciated the components described herein, their arrangement and functionality have been provided solely as examples for explanation and should not be construed to limit the various aspects disclosed herein to the specific details provided in the illustrated examples.

Figure 3:
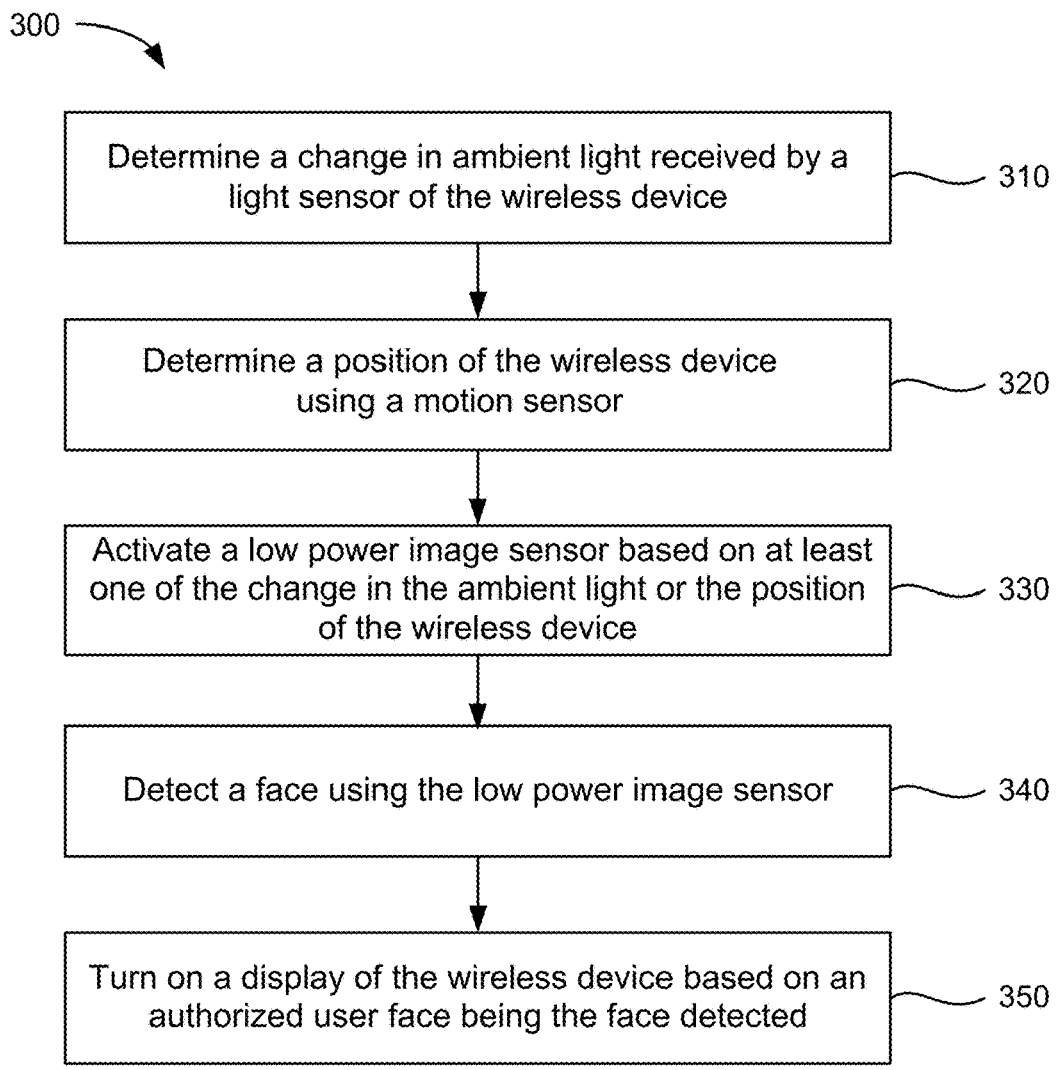
FIG. 3 illustrate a flowchart corresponding to one or more methods of improving power usage of a wireless device, according to various aspects of the disclosure.

It will be appreciated that the aspects disclosed include various methods for performing the processes, functions and/or algorithms disclosed herein. For example, FIG. 3 shows a method 300 for improving power usage of a wireless device. The method may be performed by a device such as wireless device 200, processor 220, UEs 104, 190 or other UEs shown in FIG. 1.

At block 310, the method determines a change in ambient light received by a light sensor of the wireless device. Processor 220 may determine the change in the ambient light received by wireless device 200 based on the data received from light sensor 233. Processor 220 may check for the change in the ambient light at certain time intervals to see if the change exceeds a threshold.

At block 320, the method determines a position of the wireless device using a motion sensor. Processor 220 may determine the position and/or movement of wireless device 200 based on the data detected and measured by IMU 236. Processor 220 may determine whether the position of wireless device 200 allows for the user to see display 234.

At block 330, the method activates a low power image sensor based on at least one of the change in the ambient light or the position of the wireless device. Processor 220 may activate low power image sensor 235 to detect a face based on the change of the ambient light and/or the position of wireless device 200.

At block 340, the method detects a face using the low power image sensor. Low power image sensor 235 may detect a face. It will be appreciated that the face being detected includes a recognition that the face is likely that of the user (e.g., wearer, holder) of the wireless device 200 and not just any face being detected. For example, processor 220 may turn on display 234 if the detected face is upright and does not tilt or deviate more than a threshold angle and/or other criteria, as disclosed herein.

At block 350, the method a display of the wireless device based on an authorized user face being the face detected. Processor 220 may turn on display 234 based on a user face being the face detected by low power image sensor 235. As noted above, the user face being detected is limited to the face likely being the user of the wireless device 200 based on aspects such as the orientation of the wireless device, the face tilt, and/or other aspects discussed herein.

In view of the foregoing, it will be appreciated that further aspects may include additional methods used in determining when to activate a display using the low power image sensor 235 and various techniques disclosed herein. For example, the hand movement and position may be determined by training, absolute values, and the like. For example, the user may calibrate the detection of the hand movement, e.g., from side to chest, to head, etc. In some aspects, the calibration process may include starting with the wrist down at the user's hip and then moving the wrist up near the user's chest and repeating this movement to get an average value for the movement and calculate a distance between the hip level and chest level. Further, a movement between the hip level and an above head level may be determined by starting with the wrist down at the hip and then moving the wrist up above the head) and repeating this movement to get an average value for the movement and calculate a distance between the hip level and above head level. These values can be used in the determination of when to activate the low power image sensor 235, such as discussed below.

Figure 5:
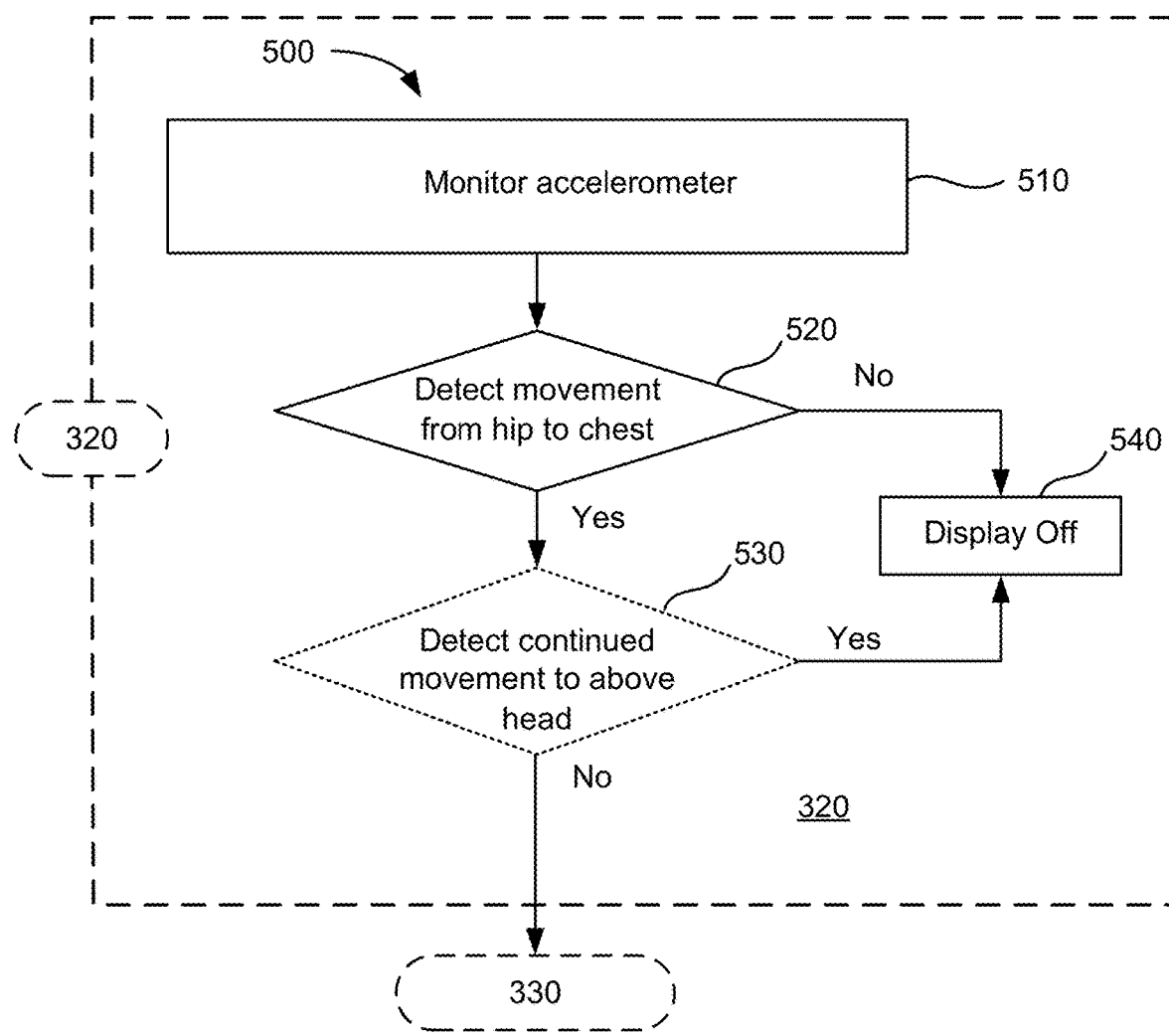
FIG. 5 illustrates a flowchart corresponding to a portion of one or more methods of improving power usage of a wireless device, according to various aspects of the disclosure.

Referring to FIG. 5, a flowchart 500 is provided that corresponds to a portion of one or more methods of improving power usage of a wireless device, according to various aspects of the disclosure. Specifically, in some aspects, the aspect of determining a position of the wireless device (e.g., 320, above) may include one or more processes, such as provided in flowchart 500. For example, in block 510, an accelerometer in the wireless device may be monitored to detect motion. In block 520, based on the monitoring of the accelerometer, the device can detect motion from the hip to the chest. This detection may be based on the results of the calibration routine that was discussed above, or may be based on preestablished movement values (e.g., preprogrammed in the wireless device, based on samples from various users, etc.). If movement from the hip to the chest is not detected, then the display will remain off at block 540 and this portion of the flowchart will end. If movement is detected, in some aspects the display can be turned on after this movement detection. In other aspects, optionally, at block 530, continued movement toward the head to an over the head level may be detected. If this continued movement is detected, then the display 234 will remain off at block 540 and this portion of the flowchart will end. It will be appreciated that in some aspects to facilitate the detection of the continued movement and to avoid false triggering a delay may be included (e.g., on the order of 50 milliseconds) before determining whether there is continued movement above the head of the user. However, at block 530, if the continued movement is not detected, then in some aspects this portion of the flowchart will return to block 330 (discussed above), and the face detection process can be initiated.

Various additional or alternative processes may be used in determining when to activate the low power image sensor 235 for face detection and/or turn on the display 234. For example, the tilt of the device could be included as part of the movement detection from the hip level to chest level, previously discussed. Additionally, the change in ambient light may be further combined with one or more of the movement detections discussed herein. Accordingly, in view of the foregoing, it will be appreciated that the various aspects disclosed are not limited to the explicit examples and combinations expressly discussed.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by a wireless device, the method comprising: determining a change in ambient light received by a light sensor of the wireless device; determining a position of the wireless device using a motion sensor; activating a low power image sensor based on at least one of the change in the ambient light or the position of the wireless device; detecting a face using the low power image sensor; and turning on a display of the wireless device based on an authorized user face being the face detected.

Clause 2. The method of clause 1, further comprising: determining whether the change in the ambient light exceeds a change threshold.

Clause 3. The method of clause 2, wherein the change threshold is based on the ambient light being classified as one of low light, indoor or outdoor.

Clause 4. The method of any of clauses 2 to 3, further comprising: determining whether the position of the wireless device allows for a user of the wireless device to view the display.

Clause 5. The method of clause 4, wherein the low power image sensor is activated when the change in the ambient light exceeds the change threshold and the position of the wireless device allows for the user to view the display.

Clause 6. The method of any of clauses 4 to 5, wherein the position of the wireless device allows for the user to view the display, when the wireless device is at a chest level of the user.

Clause 7. The method of any of clauses 4 to 6, wherein the position of the wireless device allows for the user to view the display is dependent on an orientation of the user.

Clause 8. The method of any of clauses 1 to 7, wherein detecting the face further comprises: detecting the authorized user face upon the face being upright with a tilt less than a face tilt threshold.

Clause 9. The method of clause 8, wherein the face tilt threshold is minus fifty degrees to plus fifty degrees.

Clause 10. The method of any of clauses 8 to 9, wherein detecting the face further comprises: determining the face is upside down or has a tilt greater than the face tilt threshold; and determining the authorized user face is not detected, wherein the display is not turned on based on the authorized user face not being detected.

Clause 11. The method of any of clauses 1 to 10, wherein determining the position of the wireless device further comprises: measuring a movement and an orientation of the wireless device relative to a user of the wireless device.

Clause 12. The method of clause 11, wherein the orientation of the wireless device includes a rotational movement of the wireless device.

Clause 13. The method of any of clauses 11 to 12, wherein the movement and the orientation of the wireless device is determined relative to the user of the wireless device.

Clause 14. The method of any of clauses 11 to 13, wherein the movement of the wireless device includes velocity measurements.

Clause 15. The method of any of clauses 1 to 14, wherein the low power image sensor comprises an image sensor and a low power processor.

Clause 16. A wireless device, comprising: a memory; a light sensor; a low power image sensor; a motion sensor; and at least one processor communicatively coupled to the memory, the light sensor, the motion sensor and the low power image sensor, the at least one processor configured to: determine a change in ambient light received by the light sensor of the wireless device; determine a position of the wireless device using the motion sensor; activate a low power image sensor based on at least one of the change in the ambient light or the position of the wireless device; detect a face using the low power image sensor; and turn on a display of the wireless device based on an authorized user face being the face detected.

Clause 17. The wireless device of clause 16, wherein the at least one processor is further configured to: determine whether the change in the ambient light exceeds a change threshold.

Clause 18. The wireless device of clause 17, wherein the change threshold is based on the ambient light being classified as one of low light, indoor or outdoor.

Clause 19. The wireless device of any of clauses 17 to 18, wherein the at least one processor is further configured to: determine whether the position of the wireless device allows for a user of the wireless device to view the display.

Clause 20. The wireless device of clause 19, wherein the low power image sensor is activated when the change in the ambient light exceeds the change threshold and the position of the wireless device allows for the user to view the display.

Clause 21. The wireless device of any of clauses 19 to 20, wherein the position of the wireless device allows for the user to view the display, when the wireless device is at a chest level of the user.

Clause 22. The wireless device of any of clauses 19 to 21, wherein the position of the wireless device that allows for the user to view the display is dependent on an orientation of the user.

Clause 23. The wireless device of any of clauses 16 to 22, wherein the at least one processor is further configured to: detect the authorized user face upon the face being upright with a tilt less than a face tilt threshold, where approximately 0 degrees is an orientation of the face being upright.

Clause 24. The wireless device of clause 23, wherein the face tilt threshold is minus fifty degrees to plus fifty degrees.

Clause 25. The wireless device of any of clauses 23 to 24, wherein the at least one processor is further configured to: determine the face is upside down or has a tilt greater than the face tilt threshold; and determine the authorized user face is not detected, wherein the display is not turned on based on the authorized user face not being detected.

Clause 26. The wireless device of any of clauses 16 to 25, wherein to determine the position of the wireless device further comprises: to measure a movement and an orientation of the wireless device relative to a user of the wireless device.

Clause 27. The wireless device of clause 26, wherein the orientation of the wireless device includes a rotational movement of the wireless device.

Clause 28. The wireless device of any of clauses 26 to 27, wherein the movement and the orientation of the wireless device is determined relative to the user of the wireless device.

Clause 29. The wireless device of any of clauses 26 to 28, wherein the movement of the wireless device includes velocity measurements.

Clause 30. The wireless device of any of clauses 16 to 29, wherein the low power image sensor comprises an image sensor and a low power processor.

Clause 31. A wireless device, comprising: means for determining a change in ambient light received by the wireless device; means for determining a position of the wireless device; means for activating a low power image sensor based on at least one of the change in the ambient light or the position of the wireless device; means for detecting a face using the low power image sensor; and means for turning on a display of the wireless device of based on an authorized user face being the face detected.

Clause 32. The wireless device of clause 31, further comprising: means for determining whether the change in the ambient light exceeds a change threshold.

Clause 33. The wireless device of clause 32, further comprising: means for determining whether the position of the wireless device allows for a user of the wireless device to view the display.

Clause 34. The wireless device of any of clauses 31 to 33, wherein the means for detecting the face further comprises: means for determining the face is upright with a tilt less than a face tilt threshold.

Clause 35. The wireless device of clause 34, wherein the means for detecting the face further comprises: means for determining the face is upside down or has a tilt greater than the face tilt threshold; and means for determining the authorized user face is not detected, wherein the display is not turned on based on the authorized user face not being detected.

Clause 36. A -transitory computer-readable medium configured to store computer-executable instructions that, when executed by a processor, cause the processor to: determine a change in ambient light received by a light sensor of a wireless device; determine a position of the wireless device using a motion sensor; activate a low power image sensor based on at least one of the change in the ambient light or the position of the wireless device; detect a face using the low power image sensor; and turn on a display of the wireless device based on an authorized user face being the face detected.

Clause 37. The non-transitory computer-readable medium of clause 36 further comprising computer-executable instructions that, when executed by a processor, cause the processor to: detect the user face upon the face being upright with a tilt less than a face tilt threshold.

Clause 38. The non-transitory computer-readable medium of clause 37 further comprising computer-executable instructions that, when executed by the processor, cause the processor to: determine the face is upside down or has a tilt greater than the face tilt threshold; and determine the authorized user face is not detected, wherein the display is not turned on based on the authorized user face not being detected.

Clause 39. The non-transitory computer-readable medium of any of clauses 36 to 38 further comprising computer-executable instructions that, when executed by the processor, cause the processor to: measure a movement and an orientation of the wireless device relative to a user of the wireless device.

Clause 40. The non-transitory computer-readable medium of clause 39, wherein the orientation of the wireless device includes a rotational movement of the wireless device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a wireless device, the method comprising:
    determining a change in ambient light received by a light sensor of the wireless device;
    determining positional information of the wireless device using a motion sensor, the positional information including an angle of the wireless device, a rotation of the wireless device, a movement of the wireless device, or a combination thereof;
    activating, while a display of the wireless device is turned off, a low power image sensor for a face detection process based on at least one of the change in the ambient light or the positional information of the wireless device; and
    turning on the display of the wireless device based on a detected face from the face detection process by the low power image sensor corresponding to an authorized user face.

2. The method of claim 1, further comprising:
    determining whether the change in the ambient light exceeds a change threshold.

3. The method of claim 2, wherein the change threshold is based on the ambient light being classified as one of low light, indoor or outdoor.

4. The method of claim 2, further comprising:
    determining whether a position of the wireless device based on the positional information allows for a user of the wireless device to view the display.

5. The method of claim 4, wherein the low power image sensor is activated when the change in the ambient light exceeds the change threshold and the position of the wireless device allows for the user to view the display.

6. The method of claim 4, wherein the position of the wireless device allows for the user to view the display, when the wireless device is at a chest level of the user.

7. The method of claim 4, wherein the position of the wireless device allows for the user to view the display is dependent on an orientation of the user.

8. The method of claim 1, wherein the face detection process comprises:
    determination of whether the detected face corresponds to the authorized user face upon the detected face being upright with a tilt less than a face tilt threshold.

9. The method of claim 8, wherein the face tilt threshold is minus fifty degrees to plus fifty degrees, where approximately 0 degrees is an orientation of the detected face being upright.

10. The method of claim 8, wherein the face detection process further comprises:
    determining that the authorized user face is not detected based on the detected face is determined as being upside down or having a tilt greater than the face tilt threshold,
    wherein the display is not turned on based on the authorized user face not being detected.

11. The method of claim 1, wherein the determining the position positional information of the wireless device further comprises:
    measuring the movement and an orientation of the wireless device relative to a user of the wireless device.

12. The method of claim 11, wherein the orientation of the wireless device includes a rotational movement of the wireless device.

13. The method of claim 11, wherein the movement and the orientation of the wireless device is determined relative to the user of the wireless device.

14. The method of claim 11, wherein the movement of the wireless device includes velocity measurements.

15. The method of claim 1, wherein the low power image sensor comprises an image sensor and a low power processor.

16. A wireless device, comprising:
    a memory;
    a display;
    a light sensor;
    a low power image sensor;
    a motion sensor; and
    at least one processor communicatively coupled to the memory, the light sensor, the motion sensor and the low power image sensor, the at least one processor configured to:
        determine a change in ambient light received by the light sensor of the wireless device;
        determine positional information of the wireless device using the motion sensor, the positional information including an angle of the wireless device, a rotation of the wireless device, a movement of the wireless device, or a combination thereof;
        activate, while the display of the wireless device is turned off, the low power image sensor for a face detection process based on at least one of the change in the ambient light or the positional information of the wireless device; and
        turn on the display of the wireless device based on a detected face from the face detection process by the low power image sensor corresponding to an authorized user face.

17. The wireless device of claim 16, wherein the at least one processor is further configured to:
    determine whether the change in the ambient light exceeds a change threshold.

18. The wireless device of claim 17, wherein the change threshold is based on the ambient light being classified as one of low light, indoor or outdoor.

19. The wireless device of claim 17, wherein the at least one processor is further configured to:
    determine whether a position of the wireless device based on the positional information allows for a user of the wireless device to view the display.

20. The wireless device of claim 19, wherein the low power image sensor is activated when the change in the ambient light exceeds the change threshold and the position of the wireless device allows for the user to view the display.

21. The wireless device of claim 19, wherein the position of the wireless device allows for the user to view the display, when the wireless device is at a chest level of the user.

22. The wireless device of claim 19, wherein the position of the wireless device that allows for the user to view the display is dependent on an orientation of the user.

23. The wireless device of claim 16, wherein the at least one processor is further configured to:
    determine whether the detected face corresponds to the authorized user face upon the detected face being upright with a tilt less than a face tilt threshold.

24. The wireless device of claim 23, wherein the face tilt threshold is minus fifty degrees to plus fifty degrees, where approximately 0 degrees is an orientation of the detected face being upright.

25. The wireless device of claim 23, wherein the at least one processor is further configured to:
determine that the authorized user face is not detected based on the detected face is determined as being upside down or having a tilt greater than the face tilt threshold,
wherein the display is not turned on based on the authorized user face not being detected.

26. The wireless device of claim 16, wherein the at least one processor configured to determine the positioning information of the wireless device is further configured to:
measure the movement and an orientation of the wireless device relative to a user of the wireless device.

27. The wireless device of claim 26, wherein the orientation of the wireless device includes a rotational movement of the wireless device.

28. The wireless device of claim 26, wherein the movement and the orientation of the wireless device is determined relative to the user of the wireless device.

29. The wireless device of claim 26, wherein the movement of the wireless device includes velocity measurements.

30. The wireless device of claim 16, wherein the low power image sensor comprises an image sensor and a low power processor.

31. A wireless device, comprising:
means for determining a change in ambient light received by the wireless device;
means for determining positional information of the wireless device, the positional information including an angle of the wireless device, a rotation of the wireless device, a movement of the wireless device, or a combination thereof;
means for activating, while a display of the wireless device is turned off, a low power image sensor for a face detection process based on at least one of the change in the ambient light or the positional information of the wireless device; and
means for turning on the display of the wireless device based on a detected face from the face detection process by the low power image sensor corresponding to an authorized user face.

32. The wireless device of claim 31, further comprising:
means for determining whether the change in the ambient light exceeds a change threshold.

33. The wireless device of claim 32, further comprising:
means for determining whether a position of the wireless device based on the positional information allows for a user of the wireless device to view the display.

34. The wireless device of claim 31, further comprising:
means for determining whether the detected face is upright with a tilt less than a face tilt threshold.

35. The wireless device of claim 34, wherein the face detection process further comprises:
determining that the authorized user face is not detected based on the detected face is determined as being upside down or having a tilt greater than the face tilt threshold,
wherein the display is not turned on based on the authorized user face not being detected.

36. A non-transitory computer-readable medium configured to store computer-executable instructions that, when executed by a processor of a wireless device, cause the processor to:
determine a change in ambient light received by a light sensor of the wireless device;
determine positional information of the wireless device using a motion sensor, the positional information including an angle of the wireless device, a rotation of the wireless device, a movement of the wireless device, or a combination thereof;
activate, while a display of the wireless device is turned off, a low power image sensor for a face detection process based on at least one of the change in the ambient light or the positional information of the wireless device; and
turn on the display of the wireless device based on a detected face from the face detection process by the low power image sensor corresponding to an authorized user face.

37. The non-transitory computer-readable medium of claim 36, further comprising computer-executable instructions that, when executed by the processor, cause the processor to:
determine whether the detected face corresponds to the authorized user face upon the detected face being upright with a tilt less than a face tilt threshold.

38. The non-transitory computer-readable medium of claim 37, further comprising computer-executable instructions that, when executed by the processor, cause the processor to:
determine that the authorized user face is not detected based on the detected face is determined as being upside down or having a tilt greater than the face tilt threshold,
wherein the display is not turned on based on the authorized user face not being detected.

39. The non-transitory computer-readable medium of claim 36, further comprising computer-executable instructions that, when executed by the processor, cause the processor to:
measure the movement and an orientation of the wireless device relative to a user of the wireless device.

40. The non-transitory computer-readable medium of claim 39, wherein the orientation of the wireless device includes a rotational movement of the wireless device.

* * * * *